(12) United States Patent
Sheck et al.

(10) Patent No.: US 6,367,800 B1
(45) Date of Patent: Apr. 9, 2002

(54) PROJECTILE IMPACT LOCATION DETERMINATION SYSTEM AND METHOD

(75) Inventors: Michael D. Sheck; Robert W. Lancette, both of Clarksville, TN (US)

(73) Assignee: Air-Monic LLC, Nashville, TN (US)

( * ) Notice: Subject to any disclaimer, the term of this patent is extended or adjusted under 35 U.S.C. 154(b) by 0 days.

(21) Appl. No.: 09/327,061

(22) Filed: Jun. 7, 1999

(51) Int. Cl.[7] .............................. F41J 5/056; F41J 5/06
(52) U.S. Cl. ...................................... 273/372; 273/371
(58) Field of Search .................... 273/371, 372; 235/400

(56) References Cited

U.S. PATENT DOCUMENTS

| | | |
|---|---|---|
| 3,158,372 A | * 11/1964 | Ohlund et al. ............. 273/372 |
| 3,341,208 A | * 9/1967 | Marcella ..................... 473/259 |
| 3,678,495 A | 7/1972 | Gilbert |
| 4,131,012 A | 12/1978 | Courtiol |
| 4,261,579 A | 4/1981 | Bowyer et al. |
| 4,281,241 A | 7/1981 | Knight et al. |
| 4,305,142 A | 12/1981 | Springer |
| 4,350,881 A | 9/1982 | Knight et al. |
| 4,357,531 A | 11/1982 | Knight |
| RE32,123 E | 4/1986 | Knight |
| 4,898,388 A | 2/1990 | Beard, III et al. |
| 5,095,433 A | 3/1992 | Botarelli et al. |
| 5,349,853 A | 9/1994 | Oehler |

* cited by examiner

*Primary Examiner*—Jeanette Chapman
*Assistant Examiner*—M. Chambers

(57) ABSTRACT

An impact location determination system (20) includes a damage resistant strike plate (22) having a planar surface (26) adapted to be impacted by a projectile (28). Pressure sensor assemblies (55) are embedded in the strike plate (22) and detect a pressure disturbance event outwardly propagating as a wave (36) from an impact location (34). The wave (36) propagates through the strike plate (22) at a propagation velocity that is slower than the speed of sound for the strike plate (22). A signal processing circuit (32) measures time difference of arrival figures (196 and 198) between pairs of pressure sensors (140 and 142) and determines the impact location (34) in response to the time difference of arrival figures (196 and 198) and the velocity of the wave (36) through the strike plate (22).

5 Claims, 8 Drawing Sheets

(front)

(rear)

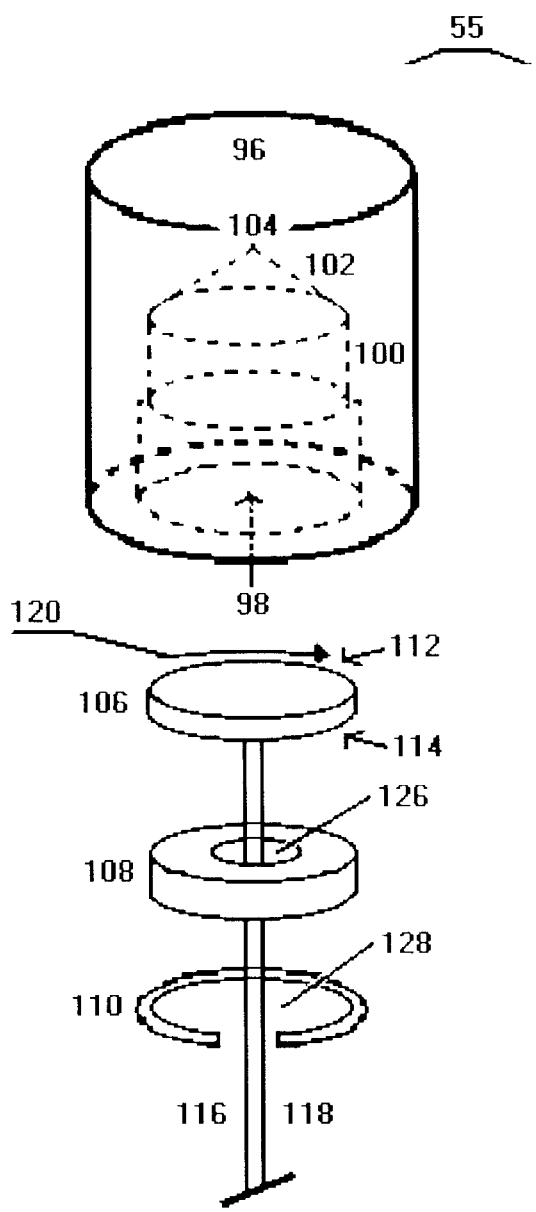
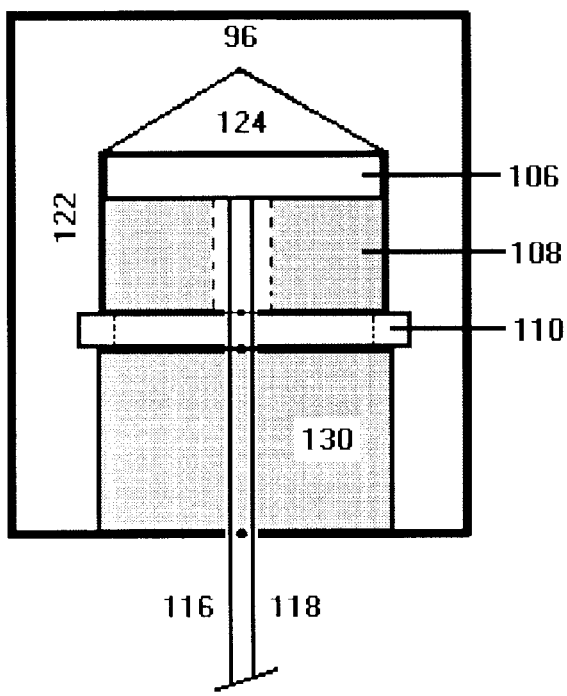
Figure 6
Figure 7

PROJECTILE IMPACT LOCATION DETERMINATION SYSTEM AND METHOD

TECHNICAL FIELD OF THE INVENTION

The present invention relates generally to systems and methods for determining impact locations of projectiles on targets. More specifically, the present invention relates to a system for determining the impact location of a projectile on a damage resistant target.

BACKGROUND OF THE INVENTION

The location of impact of a projectile is of interest in a number of different fields including weaponry and sports. For example, when a user is trained in firing a weapon, it is common to practice at a static firing range in which the user fires a weapon at targets which are remote from the firing point. Various systems and methods have been developed for determining locations of impact of such projectiles and providing the impact location information to the user.

Some prior art systems employ acoustic sensors for sensing an airborne acoustic signal generated by a projectile and for determining the location at which the projectile passes through or strikes a predetermined plane. For example, one such system includes microphones arrayed around a destructible target medium, such as heavy paper, rubber, or plastic sheeting. The sound of a projectile punching through the medium is detected by the microphones. The time difference of arrival of the sound is calculated between the microphones, and a location for the "punch through" point is then determined.

Unfortunately, since the target is damaged each time a projectile strikes the target medium, it is necessary to constantly roll, advance, or otherwise replace that portion of the target which has been destroyed by the previously fired projectile. In addition, such acoustically based destructible medium impact location systems are not designed to be "missed". In other words, the target medium transport and alignment hardware and the microphones are not designed to endure the shock from repeated strikes. These problems contribute undesirably to the expense of operating and maintaining such a destructible target medium impact location system.

In acoustically based impact location systems, mathematical formulas for locating impact locations through time difference of arrival of an airborne sound wave depend upon the application of a velocity of sound value which is constant for the airborne sound wave. The velocity of sound through air is unstable, and highly dependent upon atmospheric conditions. Thus, the application of a constant velocity of sound value to the mathematical formulas introduces calculation errors. In addition, since the mathematical formulas depend upon the application of a constant velocity of sound value, the distance between microphones is a major factor in determining accuracy. Accordingly, an increase in target size, and hence, distance between the microphones located at the perimeter of the target, results in decreasing of accuracy.

Other prior art impact location systems employ a destruction resistant target medium, such as steel, that mitigate the problems associated with the destructible target medium impact location systems. One such system employs piezoelectric type sensors arrayed about the perimeter of the destruction resistant target. The target area around a sensor defines a sector for that sensor. As a projectile strikes the target, the impact is registered by the sensors. The approximate impact location is determined by using the sensor signals and logic circuitry. A lamp is then lit to indicate in which of the sensor sectors the impact is located.

Unfortunately, this system does not provide the precise point at which the projectile strikes the target. Furthermore, since the sensors are spaced around the periphery of the target, the sensors may be hit by the projectiles. Thus, this system also suffers from the disadvantage of additional expenses resulting from the need to replace damaged sensors at frequent intervals.

SUMMARY OF THE INVENTION

Accordingly, it is an object of the present invention to provide a system for determining an impact location of a projectile.

Another object of the present invention is to provide an impact location determination system which employs a damage resistant target medium.

Another object of the present invention is to provide precise impact location information to a user.

Another object of the present invention is to provide an impact location system that accommodates large target areas without sacrificing accuracy.

Yet another object of the present invention is to provide an impact location system that has a processing speed that accommodates rapid fire projectiles.

The above and other advantages of the present invention are carried out in one form by a system for determining an impact location of a projectile. The system includes a plate having a planar surface adapted to be impacted by the projectile. A plurality of pressure sensors are disposed in the plate for detecting a pressure disturbance event outwardly propagating through the plate from the impact location on the planar surface. A signal processing circuit is in electrical communication with the pressure sensors for measuring time difference of arrivals of the pressure disturbance event between the pressure sensors and for determining the impact location in response to the time difference of arrivals.

The above and other advantages of the present invention are carried out in another form by a method for determining an impact location of a projectile on a strike plate in response to a pressure disturbance property particular to the strike plate, the pressure disturbance property being a pressure disturbance propagation velocity. The method calls for detecting, at each of a plurality of pressure sensors coupled to the strike plate, a pressure disturbance event exhibiting the propagation velocity, the pressure disturbance event outwardly propagating from the impact location of the projectile on the strike plate. The method further calls for measuring time difference of arrivals of the pressure disturbance event between the pressure sensors and determining the impact location in response to the time difference of arrivals and the pressure disturbance propagation velocity, the pressure disturbance propagation velocity being less than the velocity of sound in the strike plate.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows an exploded perspective view of a sensor assembly that is embedded in the strike plate;

FIG. 7 shows a side sectional view of the sensor assembly;

DETAILED DESCRIPTION OF THE PREFERRED EMBODIMENTS

Figure 1:
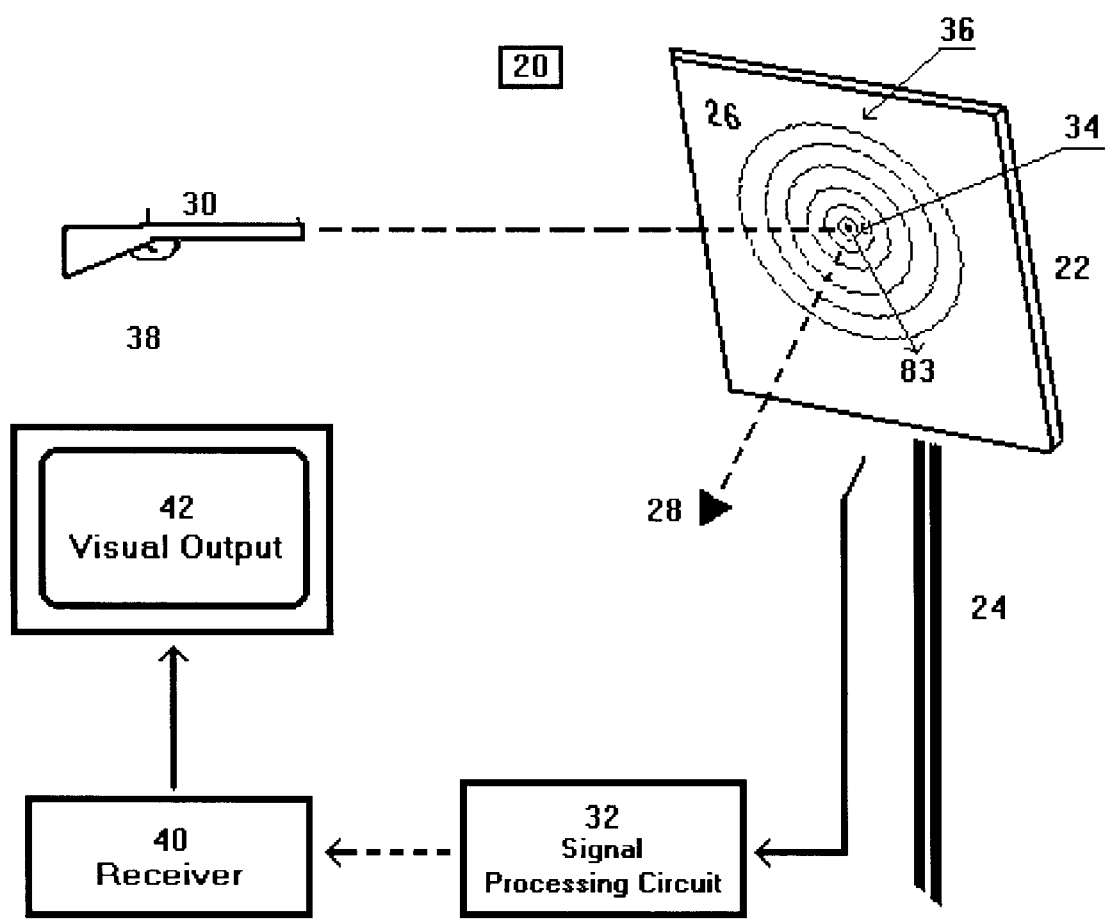
FIG. 1 shows an impact location determination system in accordance with a preferred embodiment of the present invention.

FIG. 1 shows an impact location determination system 20 in accordance with a preferred embodiment of the present invention. System 20 includes a strike plate 22 coupled to a support member 24. Strike plate 22 has a planar strike surface 26 that is adapted to be impacted by a projectile 28 shot from a firearm 30. A plurality of sensor assemblies (discussed below) are disposed in strike plate 22 and are in electrical communication with a signal processing circuit 32. The sensor assemblies are configured to detect a pressure disturbance event outwardly propagating through strike plate 22 from an impact location 34 as a wave 36, depicted as concentric rings emanating from impact location 34.

Signal processing circuit 32 is adapted to determine the impact location 34 of projectile 28 by measuring time difference of arrivals of wave 36 between pairs of the sensor assemblies. Data describing impact location 34 is transmitted from signal processing circuit 32 over a radio, wire, or other communication link 38 to a receiver 40. Receiver 40 subsequently communicates the data to a visual display device 42 so that the shooter, an instructor, and/or observers may see where projectile 28 impacts strike plate 22.

Figure 2:
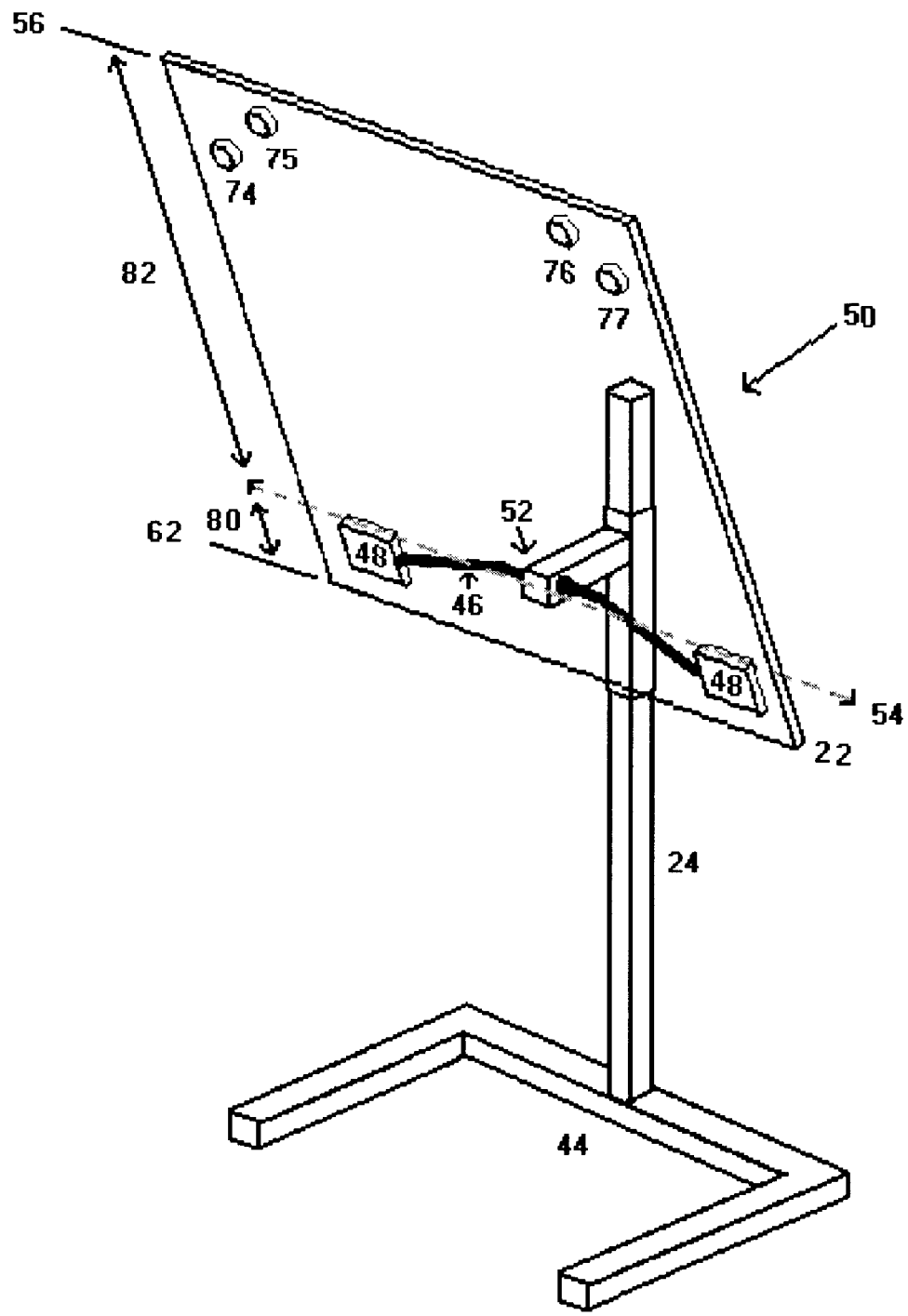
FIG. 2 shows a perspective view of a strike plate coupled to a support member.

FIG. 2 shows a perspective view of strike plate 22 coupled to support member 24. Support member 24 includes a fixed base 44, a pivot member 46 coupled to fixed base 44, and mounts 48 secured to a back planar surface 50 of strike plate 22 and to pivot member 46. Fixed base 44 includes a cradle portion 52 for loosely accommodating pivot member 46. Pivot member 46 lies in cradle portion 52 such that when planar strike surface 26 is struck by projectile 28 (FIG. 1), strike plate 22 is permitted to rotate about a pivot axis 54 established by the positioning of pivot member 46 in cradle portion 52 of fixed base 44. The movement of strike plate 22 around axis 54 upon impact of projectile 28 (FIG. 1) dampens the force of the impact.

Figure 3:
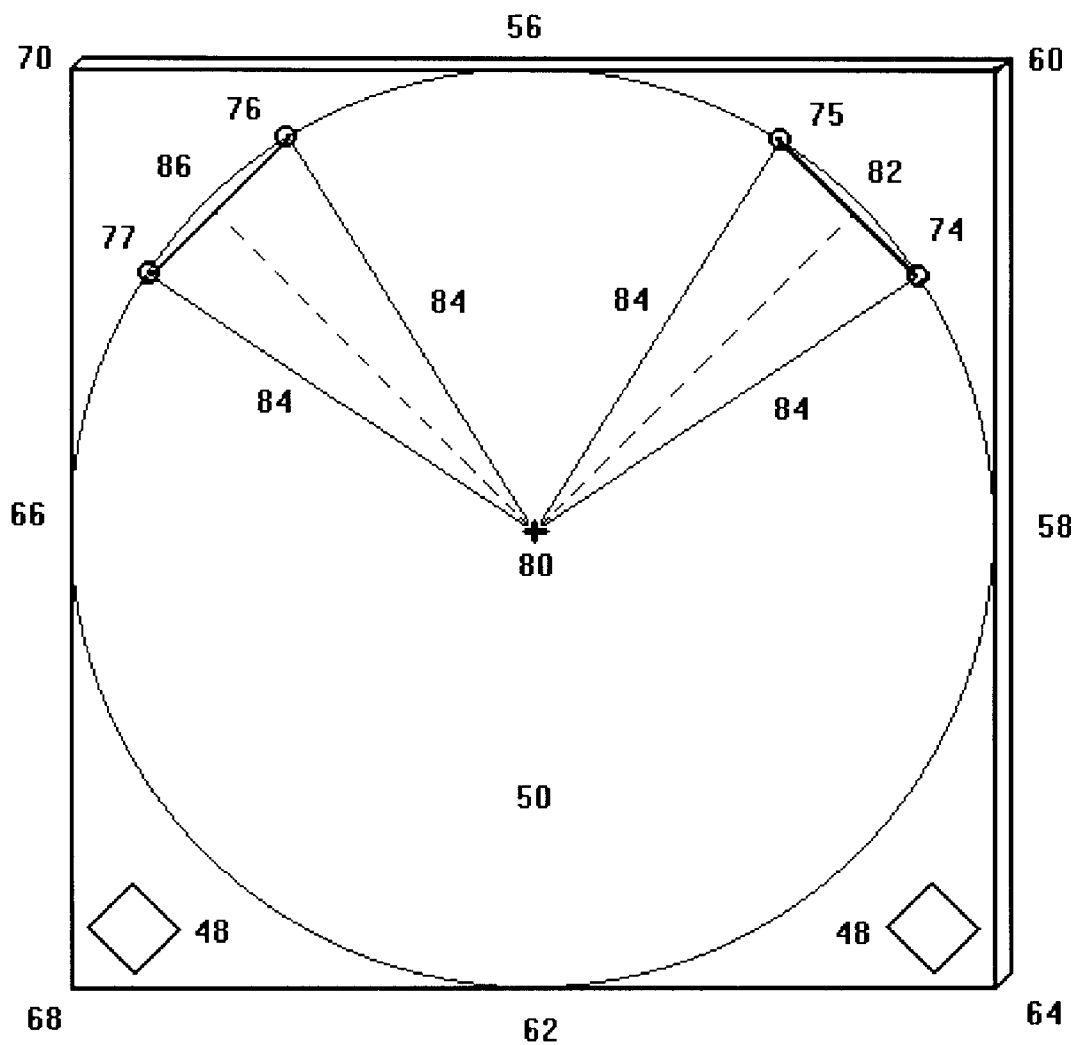
FIG. 3 shows a back view of the strike plate.
Figures 4, 5:
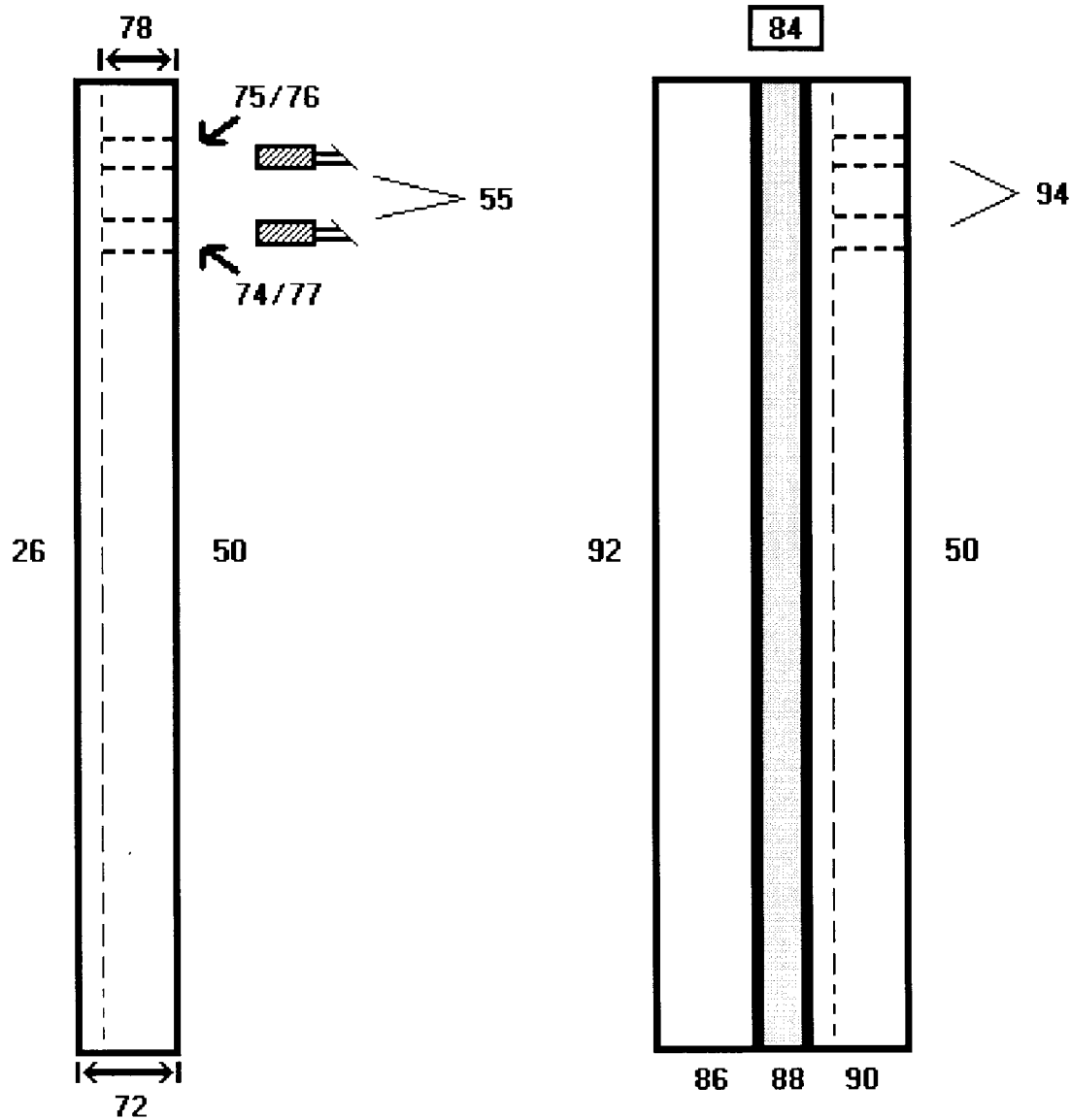
FIG. 4 shows a side view of the strike plate and a plurality of pressure sensor assemblies to be disposed in the strike plate.
FIG. 5 shows a side view of an alternative embodiment of the strike plate.

Referring to FIGS. 3–4 in connection with FIG. 2, FIG. 3 shows a back view of strike plate 22 with mounts 48 secured to back planar surface 50 and FIG. 4 shows a side view of strike plate 22 and pressure sensor assemblies 55 to be disposed in strike plate 22. Strike plate 22 has a first side 56, a second side 58 intersecting first side 56 at a first corner 60, a third side 62 intersecting second side 58 at a second corner 64, and a fourth side 66 intersecting third side 62 at a third corner 68 and intersecting first side 56 at a fourth corner 70.

Planar strike surface 26 and back planar surface 50 are separated by a plate depth 72. First and second holes 74 and 75, respectively, extend from back planar surface 50 into strike plate 22 and are positioned proximate first corner 60. Likewise, third and fourth holes 76 and 77 extend from back planar surface 50 into strike plate 22 proximate fourth corner 70. First, second, third, and fourth holes 74, 75, 76, and 77, respectively, are substantially equidistant from an approximate midpoint 80 of planar strike surface 26. A first baseline distance 82 between first and second holes 74 and 75 is less than a radial distance 84 between each of first and second holes 74 and 75 and midpoint 80. Likewise, a second baseline distance 86 between third and fourth holes 76 and 77 is less than radial distance 84 between each of third and fourth holes 76 and 77 and midpoint 80.

One of pressure sensor assemblies 55 is positioned in each of first, second, third, and fourth holes 74, 75, 76, and 77. Accordingly, pressure sensor assemblies 55 are equidistant from midpoint 80. In addition, each of first, second, third, and fourth holes 74, 75, 76, and 77, respectively, exhibits a hole depth 78 which is less than plate depth 72. Thus, sensor assemblies 55 are embedded in strike plate 22 and spaced apart from planar strike surface 26. This configuration protects sensor assemblies 55 from being damaged when planar strike surface 26 is struck by projectile 28 (FIG. 1).

First side 56 and third side 62 are located on opposing edges of planar strike surface 26. Sensor assemblies 55 are located proximate first side 56 and mounts 48 are located proximate third side 62. A distance 80 (FIG. 2) between pivot axis 54 and third side 62 is less than a distance 82 (FIG. 2) between pivot axis 54 and first side 56. Pivot member 46 is free to pivot in cradle portion 52 so that strike plate 22 tilts forward causing projectile 28 to be deflected downward (see FIG. 1) after impacting strike plate 22.

Sensor assemblies 55 are desirably located at the farthest possible distance from mounts 48. This configuration mitigates problems with amplitude disparities between signals generated by impacts occurring close to sensor assemblies 55 and by impacts occurring further from the sensor assemblies 55. In particular, the closer impact location 34 (FIG. 1) is to sensor assemblies 55, the greater the amplitude of wave 36 (FIG. 1) detectable by sensor assemblies 55 may be.

With pivot axis 54 located closer to third side 62, i.e., nearer to mounts 48, the greatest leverage is realized at first side 56, i.e., the top side of strike plate 22. This causes strike plate 22 to pivot easier when impacted near first side 56 so that the closer impact location 34 (FIG. 1) is to sensor assemblies 55, the higher the percentage of energy that will be absorbed by the pivoting of strike plate 22. The overall effect is to limit the edge-to-edge amplitude disparity of the pressure disturbance event in order to eliminate problems in signal processing circuit 32 associated with input trigger sensitivity and overdrive/crosstalk levels.

The present invention exploits a pressure disturbance property particular to strike plate 22. In a preferred embodiment of the present invention, strike plate 22 is formed from an optically clear solid polycarbonate material which is free from pronounced density of refraction points. Thus, the homogeneity of the polycarbonate material results in wave 36 propagating through strike plate 22 at a substantially constant propagation velocity, depicted by an arrow 83 in FIG. 1, from impact location 34. The pressure disturbance property is this constant propagation velocity of wave 36 through the polycarbonate material.

It has been discovered that a pressure disturbance event caused by the striking of projectile 28 (FIG. 1) on strike plate 22 results in wave 36 outwardly propagating from impact location 34 through strike plate 22 at a propagation velocity which is less than the speed of sound through the same polycarbonate material. The propagation velocity of wave 36 was determined empirically through time difference of arrival calculations of waves outwardly propagating from impact locations of projectiles striking the polycarbonate material at known locations under controlled conditions.

In a preferred embodiment, the propagation velocity of wave 36 through strike plate 22 is less than 1,750 meters/second. It is known that the velocity of a longitudinal acoustic wave in clear polycarbonate is 2,270 meters/second. In the specific embodiment of the present invention in which strike plate 22 is polycarbonate, the propagation velocity of wave 36 is substantially 1,605 meters/second which is significantly lower than the speed of sound of an acoustic wave propagating through the polycarbonate material. The use of wave 36 over an acoustic wave propagating through the strike plate at 2,270 meters/second is preferred because the acoustic wave is difficult to isolate and prone to crosstalk causing difficulties in determining its time of arrival at each of sensor assemblies 55.

In addition to the constant propagation velocity of wave 36, the polycarbonate material is resistant to damage when struck by projectiles fired from air guns and from sports projectiles such as golf balls, baseballs, and the like. However, the polycarbonate material is not strong enough to resist being damaged when system 20 is used with firearms which shoot faster, heavier projectiles.

FIG. 5 shows a side view of an alternative strike plate 84 for use with firearms which shoot faster, heavier projectiles. Strike plate 84 includes a first layer 86, a second layer 88 bonded to first layer 86, and a third layer 90 bonded to second layer 88. First layer 86 is formed from steel and has a planar strike surface 92 adapted to be impacted by projectile 28 (FIG. 1). Third layer 90 is formed from polycarbonate material, and includes holes 94 in which pressure sensor assemblies 55 are located.

Second layer 88 may be formed from hard rubber sheeting, blown rubber sheeting, or foamed plastic materials, such as ethylene vinyl acetate (EVA). Second layer 88 serves as a buffer between first layer 86 and third layer 90 to protect third layer 90 and pressure sensor assemblies 55 from damage by faster, heavier projectiles. Second layer 88 also decreases the effect on pressure sensor assemblies 55 of magnetization of the steel first layer 86. Additionally, second layer 88 causes a decrease in "ringing time" of pressure sensor assemblies 55 from the pressure disturbance event propagating as wave 36 (FIG. 1) from impact location 34 (FIG. 1). The ringing time is the time required for pressure sensor assemblies 55 to decrease to a predetermined level after wave 36 is detected by pressure sensor assemblies. A decrease in the ringing time allows system 20 to readily process rapid fire impacts generated by firearm 30 (FIG. 1). In a preferred embodiment, system 20 employing either strike plate 22 or strike plate 84 is able to process approximately thirty impacts per second.

Referring to FIGS. 6–7, FIG. 6 shows an exploded perspective view of one of pressure sensor assemblies 55 embedded in strike plate 22 or alternatively in strike plate 84, and FIG. 7 shows a side sectional view of sensor assembly 55. Sensor assembly 55 includes a housing 96 having a cavity 98 formed therein. Housing 96 is machined from a nonmetallic material such as a thermoplastic resin. Cavity 98 of housing 96 has a cylindrical portion 100 and an inwardly tapered portion 102 contiguous with cylindrical portion 100 and terminating at an end 104 distal from cylindrical portion 100. A pressure sensing element 106, a damper 108, and a retainer 110 are located in cylindrical portion 100 of cavity 98.

Pressure sensing element 106 is a ceramic piezoelectric transducer that produces an output voltage between a primary sensing surface 112 and a secondary surface 114 as a result of strain due to the pressure disturbance event propagating through strike plate 22 as wave 36. Pressure sensing element 106 includes a primary sensing surface leadwire 116 and a secondary surface leadwire 118, both of which extend from secondary surface 114 for ease of routing through cavity 98.

Primary sensing surface 112 faces tapered portion 102 of cavity 98 and damper 108 abuts secondary surface 114 of pressure sensing element 106. When pressure sensor assembly 55 is press-fit into one of first, second, third, and fourth holes 74, 75, 76, and 77, respectively, of strike plate 22 (FIG. 2), tapered portion 102 is interposed between planar strike surface 26 (FIG. 1) and pressure sensing element 106.

Retainer 110 abuts damper 108 and secures pressure sensing element 106 and damper 108 in cylindrical portion 100 of cavity 98. Cavity 98 is configured such that when pressure sensing element 106 is retained in cylindrical portion 100, only a perimeter 120 of primary sensing surface 112 contacts a cavity wall 122 of housing 96. In such an arrangement, a gas cushion 124 is formed in tapered portion 102 of cavity 98 between housing 96 and the area of primary sensing surface 112 encircled by perimeter 120. When contact is limited between housing 96 and pressure sensing element 106 to perimeter 120, a disparity of signal responses between pressure sensor assemblies 55 is decreased as compared to sensor assemblies in which the contact is not limited to the perimeter of the primary sensing surface.

Damper 108 is in the form of an elastomeric O-ring such that primary sensing surface leadwire 116 and secondary sensing surface leadwire 118 are routed through a center 126 of O-ring 108. Likewise, primary sensing surface leadwire 116 and secondary sensing surface leadwire 118 are routed through a center 128 of retainer 110. The pressure of damper 108 and retainer 110 holds pressure sensing element 106 securely in place, and due to the elasticity of O-ring 108, absorbs shock generated by an impact to further protect pressure sensing element 106 from damage. After pressure sensing element 106, damper 108, and retaining clip 110 are positioned in cavity 98, cavity 98 is filled with a silicone compound 130 to protect pressure sensing element 106 from environmental conditions, such as moisture.

Figure 8:
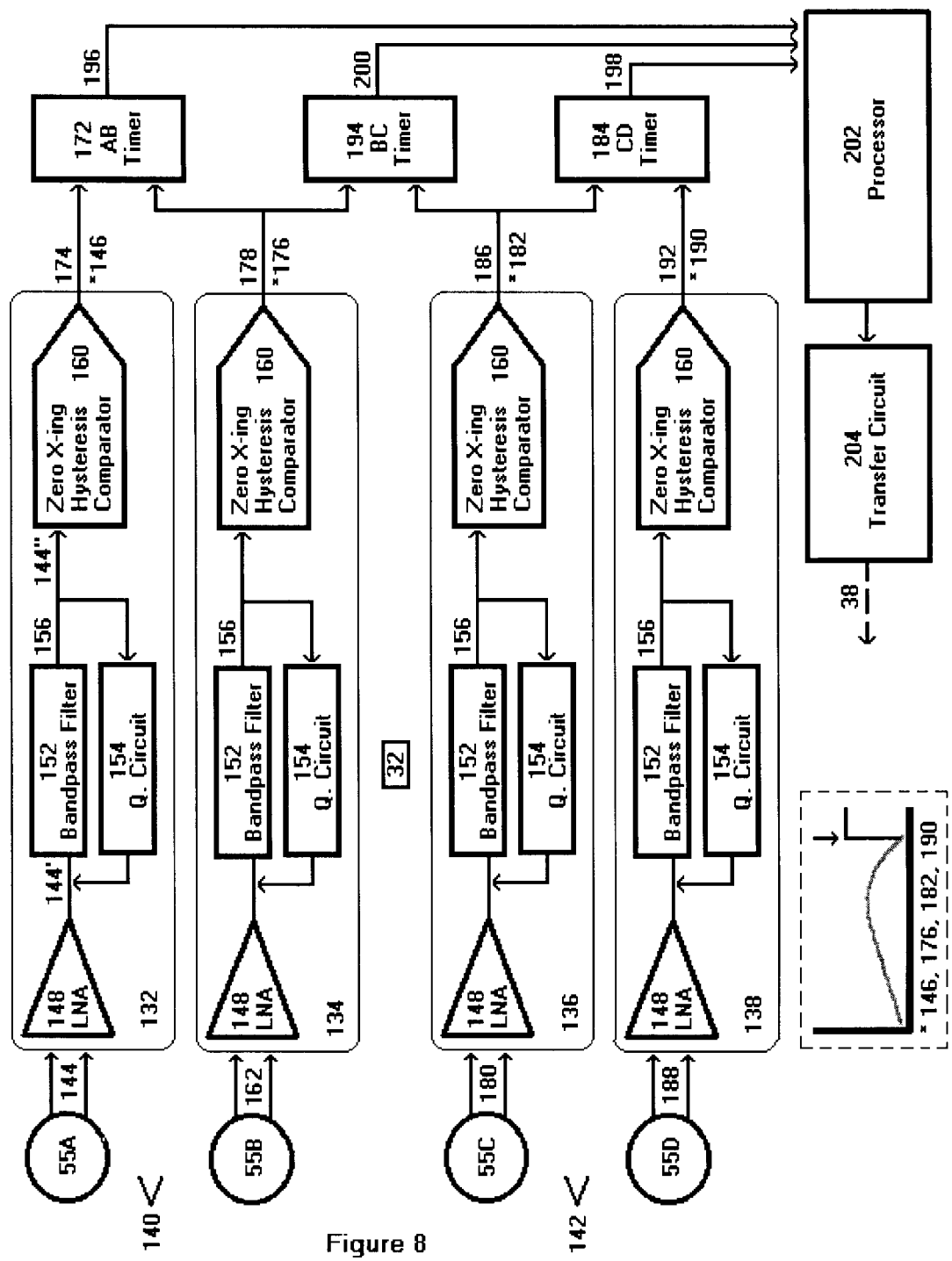
FIG. 8 shows a block diagram of a signal processing circuit of the impact location determination system.

FIG. 8 shows a block diagram of signal processing circuit 32 of impact location determination system 20. Circuit 32 includes a first isolation circuit 132, a second isolation circuit 134, a third isolation circuit 136, and a fourth isolation circuit 138. First isolation circuit 132 is in electrical communication with a first one of pressure sensor assemblies 55, hereinafter referred to as first sensor 55A, through primary sensing surface leadwire 116 (FIG. 6) and secondary sensing surface leadwire 118 (FIG. 6) of its pressure sensing element 106 (FIG. 6). Likewise, second isolation circuit 134 is in electrical communication with a second one of pressure sensor assemblies 55, hereinafter referred to as second sensor 55B. Third isolation circuit 136 is in electrical communication with a third one of pressure sensor assemblies 55, hereinafter referred to as third sensor 55C, and fourth isolation circuit 138 is in electrical communication with a fourth one of pressure sensor assemblies 55, hereinafter referred to as fourth sensor 55D.

First and second sensors 55A and 55B, respectively, form a first pair of sensors 140 and are located in first and second holes 74 and 75, respectively, of strike plate 22 (FIG. 2). Third and fourth sensors 55C and 55D, respectively, form a second pair of sensors 142 and are located in third and fourth holes 76 and 77, respectively, of strike plate 22. First, second, third, and fourth isolation circuits 132, 134, 136, and 138, respectively, are essentially identical in the preferred embodiment. Accordingly, only first isolation circuit 132 is described in detail herein. However, it should be readily apparent that the following description applies to second, third, and fourth isolation circuits 134, 136, and 138 as well.

The purpose of first isolation circuit 132 is to convert first signal 144 produced by first sensor 55A into a first pulse 146 whose edge is relative to the initial activation of first sensor 55A caused by the pressure disturbance event outwardly propagating from impact location 34 (FIG. 1) as wave 36. To accomplish this purpose, primary sensing surface leadwire 116 and secondary surface leadwire 118 are connected to a low noise differential input variable gain instrumentation amplifier (LNA) 148 and communicate first signal 144, which is a differential signal, to instrumentation amplifier 148. Instrumentation amplifier 148 is configured to shunt a major portion of the energy of first signal 144 to ground.

Instrumentation amplifier 148 produces an output signal 144' which is representative of first signal 144. Output signal 144' is communicated to a state variable bandpass filter 152. A Q circuit 154 is coupled to an output 156 of bandpass filter 152, and an output 158 of Q circuit 154 is coupled to the input of bandpass filter 152. Thus Q circuit 154 forms a feedback loop for bandpass filter 152.

Signals 144 and 144' ring when projectile 28 impacts strike plate 22. Polarities are arranged so that the initial ring signal is in a positive direction. The frequency of the ringing varies inversely with the proximity of impact location 34 (FIG. 1) to first sensor 55A. The selected Q of Q circuit 154 in the feedback loop for bandpass filter 152 shifts the phase of any frequency variations in the ringing output signal 144' so that the delay to the first zero crossing of the first half wave of wave 36 (FIG. 1) outwardly propagating from impact location 34 remains relatively constant for a range of ringing frequencies. Thus, bandpass filter 152 and Q circuit 154 form a timing error correction element for first isolation circuit 132.

A frequency corrected output signal 144" is produced by bandpass filter 152 and passes into an open collector hysteresis comparator 160. Comparator 160 triggers at roughly ten millivolts on a positive going wave and at zero volts on a negative going wave. The hysteresis feature eliminates the normal chattering of a comparator whose trigger is set close to ground potential. Comparator 160 is in an inverting mode so a negative going signal produces a positive going edge of pulse 146 when the input signal crosses zero.

Figure 9:
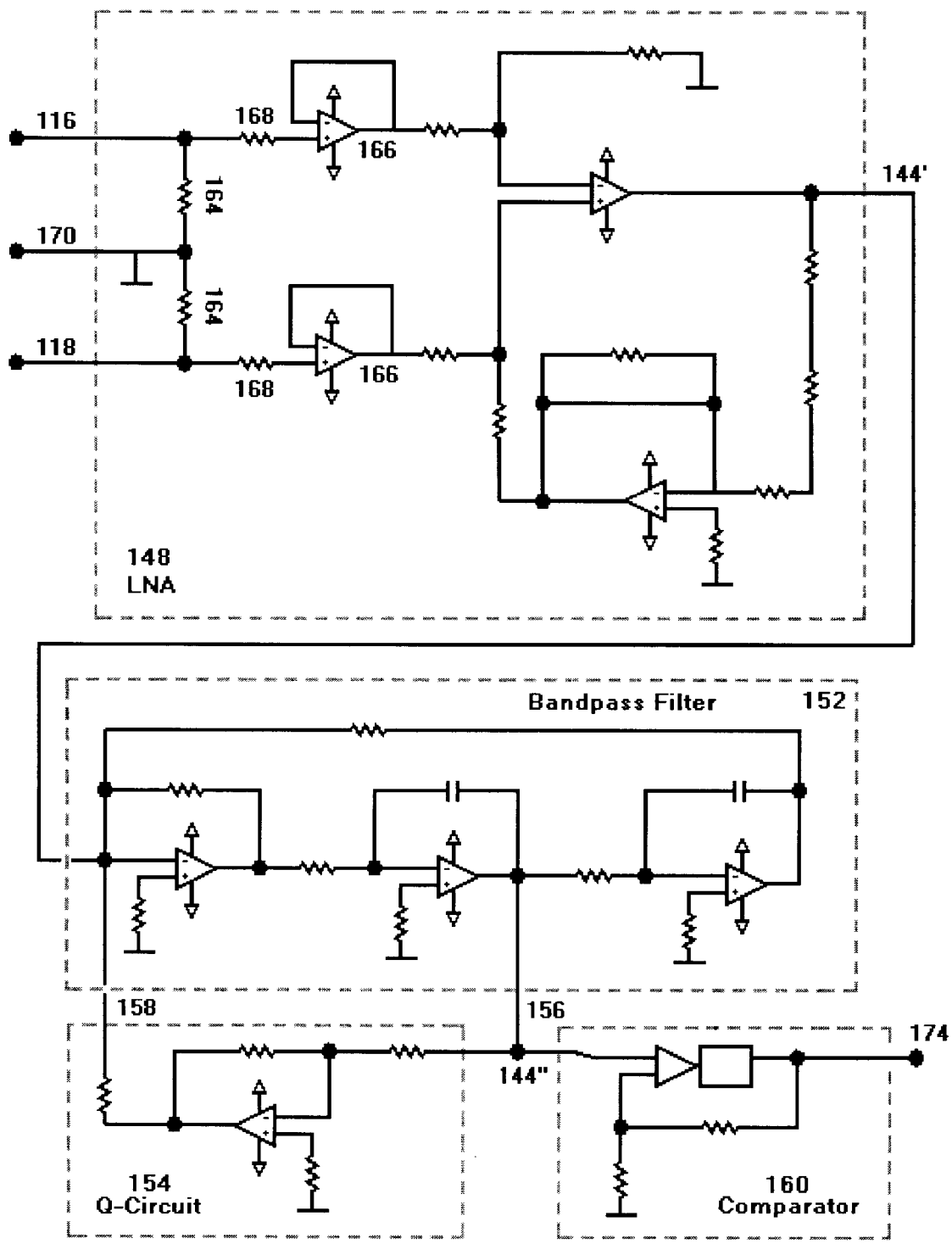
FIG. 9 shows a detailed diagram of a first isolation circuit in the signal processing circuit.

FIG. 9 shows a detailed diagram of first isolation circuit 132. The same reference numbers are shown as in FIG. 8 to designate the same elements, an exemplary configuration of these elements being shown in detail inside a dashed enclosure delimiting each element.

Low noise amplifier 148 is shown with each of primary sensing and secondary surface leadwires 116 and 118, respectively, connected to low value resistors 164 to ground for shunting the major part of the energy produced by sensor 55A. Each of primary sensing and secondary surface leadwires 116 and 118 are also connected to their respective operational amplifiers 166 by low value resistors 168 to minimize phase shift due to the input capacitance of operational amplifiers 166. First isolation circuit 132 also has a shield ground 170 for sensor 55A for the purpose of minimizing crosstalk between first sensor 55A and second sensor 55b (FIG. 8) and for minimizing local interference and noise made worse by the high impedance characteristics of sensor 55A.

Output signal 144' is passed from low noise amplifier 148 to bandpass filter 152. In the exemplary embodiment, the Q of Q circuit 154 is set at approximately 1.26. The Q is the figure of merit for an energy-storing device, tuned circuit, or resonant system. The Q of the system thus determines the rate of decay of stored energy, i.e., the higher the Q, the longer it takes for the energy to be released.

To understand the purpose of Q circuit 152, consider the following scenario. The centers of band pass filters 152 for each of first and second isolation circuits 132 and 134, respectively, is tuned to 25 kHz. In response to wave 36 (FIG. 1) outwardly propagating from impact location 34 (FIG. 1), first sensor 55A produced first ringing signal 144 exhibiting a ringing frequency of 20 kHz and second sensor 55B produced a second signal 162 (FIG. 8) exhibiting a ringing frequency of 25 kHz. Isolation circuits 132 and 134 are primarily interested in only the first one-half wave of these ringing signals to determine an activation time. The elapsed time from the moment of activation of bandpass filter 152 for first isolation circuit 132 is 1/(2*20000) or 25 microseconds. Likewise, the elapsed time from the moment of activation of bandpass filter 152 for second isolation circuit 134 is 1/(2*25000) or 20 microseconds. Thus, an elapsed time error of the actual activation of bandpass filters 152 and the zero crossing of wave 36 detected at each of first and second sensors 55A and 55B is 5 microseconds. If the propagation velocity of wave 36 is 1525 meters/second, then a 5 microsecond error translates into an error of 0.76 cm. With the Q of Q circuits 154 set to 1.26, first signal 144 having the 20 kHz ringing frequency is delayed by the circuit capacitance of Q circuit 154 so the frequency error translates into less than 0.01 cm. The reduction of the frequency error subsequently reduces error when measuring the time difference of arrival figures between first and second sensors 55A and 55B.

Referring back to FIG. 8, as discussed previously, first isolation circuit 132 converts first signal 144 produced by first sensor 55A into first pulse 146 whose edge is defined by the initial activation of first sensor 55A caused by the pressure disturbance event outwardly propagating from impact location 34 (FIG. 1) as wave 36. First pulse 146 is passed from first isolation circuit 132 to a first timer (AB TIMER) 172 by a connection 174.

In a similar manner, second isolation circuit 134 converts second signal 162 produced by second sensor 55B into a second pulse 176 which is passed from second isolation circuit 134 to first timer 172 by a connection 178. Third isolation circuit 136 converts a third signal 180 produced by third sensor 55C into a third pulse 182 which is passed from third isolation circuit 136 to a second timer (CD TIMER) 184 by a connection 186. Fourth isolation circuit 138 converts a fourth signal 188 produced by fourth sensor 55D into a fourth pulse 190 which is passed from fourth isolation circuit 138 to second timer 184 by a connection 192. In addition, second pulse 176 and third pulse 182 are passed from second and third isolation circuits 134 and 136, respectively, to a third timer (BC TIMER) 194.

First, second, and third timers 172, 184, and 194, respectively, measure the elapsed time between the initial pulse edges of a pair of sensor assemblies 55. For example, first timer 172 measures a first time difference of arrival FIG. 196 which is an elapsed time between the detection of the initial edges of first pulse 146 and second pulse 176 of first pair of sensors 140, i.e., sensors 55A and 55B. Likewise, second timer 184 measures a second time difference of arrival FIG. 198 which is an elapsed time between the detection of the initial edges of third pulse 182 and fourth pulse 190 of second pair of sensors 142, i.e., sensors 55C and 55D. Third timer 194 measures a third time difference of arrival FIG. 200 which is an elapsed time between the detection of the initial edges of second pulse 178 of second sensor 55B and third pulse 182 of third sensor 55C.

First, second, and third timers 172, 184, and 194 are in communication with a processor 202. Processor 202 receives first, second, and third time difference of arrival FIGS. 196, 198, and 200 and determines impact location 34 (FIG. 1) in response to first, second, and third time difference of arrival FIGS. 196, 198, and 200 and the propagation velocity of wave 36 (FIG. 1) through strike plate 22 (FIG. 1). Processor 202 is in communication with a transfer circuit 204 which configures the data representative of impact location 34 for transfer over communication link 38. Data transfer is known to those skilled in the art. Accordingly, transfer circuit 204 is not described in detail herein.

Figure 10:
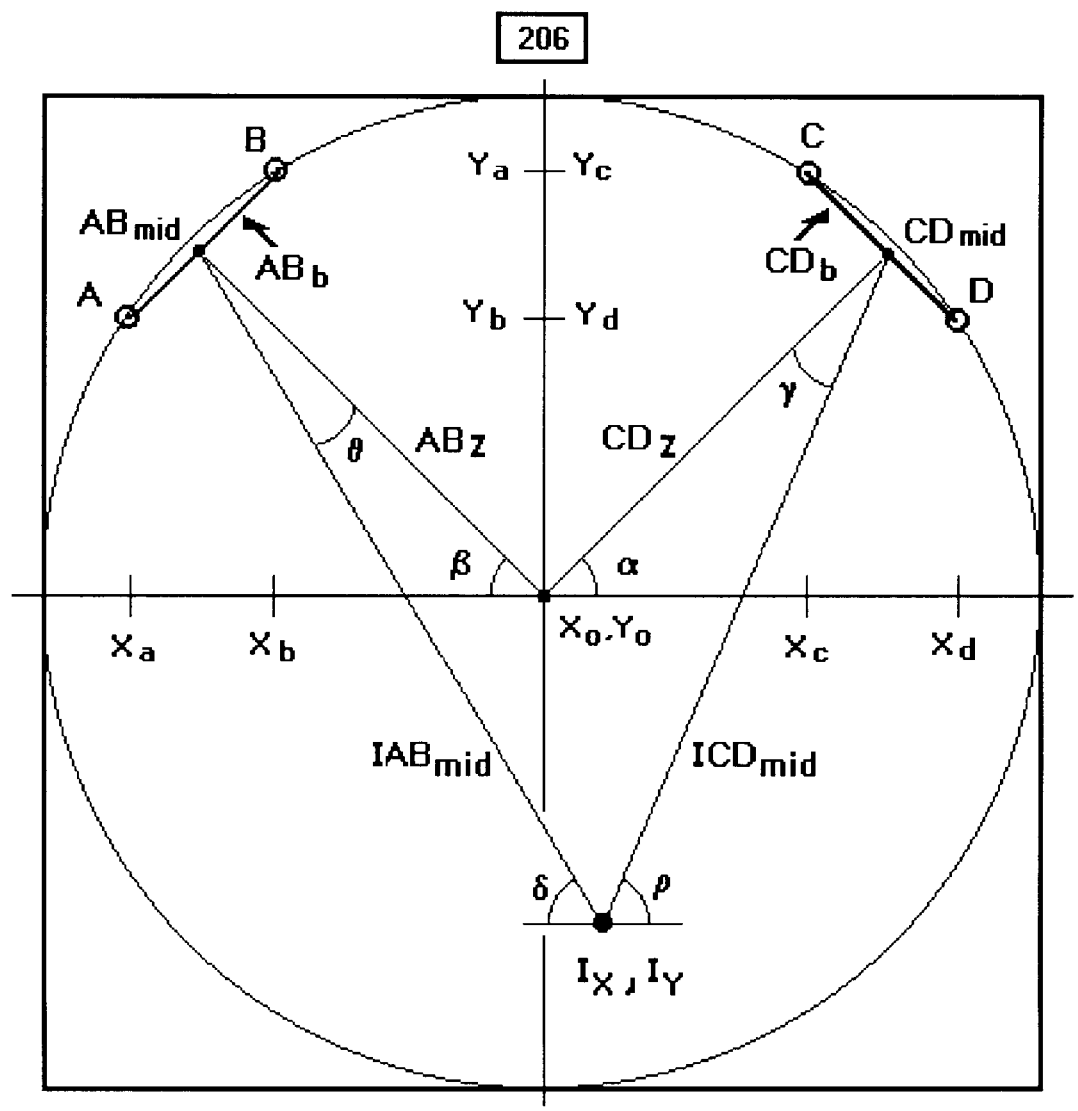
FIG. 10 shows a plane upon which four sensor points are placed for calculating angles based on time difference of arrival figures.

FIG. 10 shows a plane 206 upon which four sensor points A, B, C, and D are placed for calculating angles based on time difference of arrival figures. Plane 206 is shown as if the shooter were facing strike plate 22 (FIG. 1). Accordingly, sensor points A-D correspond to first, second, third, and fourth sensors 55A, 55B, 55C, and 55D, respectively. Impact location 34 is determined by solving a set of linear equations (discussed below) that are related to sensor points A-D. First and second time difference of arrival FIGS. 196 and 198 (FIG. 8) are used to form an angle relative to a line both perpendicular to and intersecting the midpoint to the line between a pair of sensors.

For example, a line $AB_b$ is the line between sensor points A and B. A line $AB_z$ is the line both perpendicular to and intersecting the midpoint, $AB_{mid}$, of line $AB_b$. Likewise, a line $CD_b$ is the line between sensor points C and D. A line $CD_z$ is the line both perpendicular to and intersecting the midpoint, $CD_{mid}$, of line $CD_b$.

The length of $AB_b$ is:

$$L_{AB_b} = \sqrt{(X_a-X_b)^2+(Y_a-Y_b)^2}$$

The coordinates of $AB_{mid}$ are:

$$X_{AB_{mid}}=(X_a+X_b)/2 \quad Y_{AB_{mid}}=(Y_a+Y_b)/2$$

The slope of $AB_z$ is:

$$M_{AB_z}=(X_a-X_b)/(Y_a-Y_b)$$

The angle, $\beta$, of $AB_z$ relative to the x-axis is:

$$\beta=\tan^{-1}(M_{AB_z})$$

The equation for a line may be represented as $y=Mx+K$, where K is the constant. Accordingly, K for line $AB_z$ is:

$$K_{AB_z}=Y_{AB_{mid}}-(M_{AB_z})(X_{AB_{mid}})$$

Applying the above equations to sensor points C and D yields:

$$K_{CD_z}=Y_{CD_{mid}}-(M_{CD_z})(X_{CD_{mid}})$$

The origin of a Cartesian system relative to the location of sensor points A, B, C, and D is the point where $AB_z$ and $CD_z$ intersect. This point has the coordinates $(x_o,Y_o)$. Solving the equation for a line to determine the coordinates $(X_o,Y_o)$ yields:

$$(M_{AB_z})(X_o)+K_{AB_z}=(M_{CD_z})(X_o)+K_{CD_z}$$

$$X_o = \frac{(K_{CD_z} - K_{AB_z})}{(M_{AB_z} - M_{CD_z})}$$

$$Y_o=M_{AB_z}(X_o)+K_{AB_z}$$

The maximum time difference of arrival, $\Delta Tmax_{AB}$, between sensor points A and B is when an impact location lies along a line extending from $AB_b$. The constant propagation velocity of wave 36 is represented by Vel(meters/sec). Thus, $$\Delta Tmax_{AB} \sec = \frac{L_{AB_b} \text{ meters}}{\text{Vel(meters/sec)}}$$

$$\Delta Tmax_{CD} \sec = \frac{L_{CD_b} \text{ meters}}{\text{Vel(meters/sec)}}$$

First and second time difference of arrival FIGS. 196 and 198, respectively, are utilized by processor 202 (FIG. 8) to determine angles relative to $AB_z$ and $CD_z$. First time difference of arrival FIG. 196, i.e., $\Delta t_{AB}$, is the difference in activation time between sensor points A and B. $\Delta t_{AB}$ is negative if first sensor 55A (FIG. 8), located at sensor point A and counterclockwise of $AB_z$, is the first sensor activated of first sensor pair 140 (FIG. 8). $\Delta t_{AB}$ is positive if second sensor 55B (FIG. 8) is the first sensor activated of first sensor pair 140 (FIG. 8). Likewise, second time difference of arrival FIG. 198, i.e. $\Delta t_{CD}$, is the difference in activation time between sensor points C and D. $\Delta t_{CD}$ is negative if third sensor 55C (FIG. 8), located at sensor point C and counterclockwise of $CD_z$, is the first sensor activated of second sensor pair 142 (FIG. 8). $\Delta t_{CD}$ is positive if fourth sensor 55D (FIG. 8) is the first sensor activated of second sensor pair 142 (FIG. 8). The angle of impact location (I) 34 relative to $AB_z$ and $CD_z$ can be found by employing the ratio of the time difference of arrival figure to the maximum time difference of arrival figure as follows:

$$\theta=\sin^{-1}(\Delta t_{AB}/\Delta Tmax_{AB})$$

$$\gamma=\sin^{-1}(\Delta t_{CD}/\Delta Tmax_{CD})$$

Shifting the angle of impact location (I) 34 relative to the coordinate system having an origin at $(X_o,Y_o)$ yields the following equations:

$$\delta=\beta-\theta$$

$$\rho=\alpha-\gamma$$

The line, $IAB_{mid}$, intersecting impact location, I, and the midpoint, $AB_{mid}$, to the line between sensor points A and B can be found as follows:

$$M_{IAB_{mid}}=\tan\delta$$

$$K_{IAB_{mid}}=Y_{IAB_{mid}}-M_{IABmid}(X_{IAB_{mid}})$$

Likewise, the line, $ICD_{mid}$, intersecting impact location, I, and the midpoint, $CD_{mid}$, to the line between sensor points C and D can be found as follows:

$$M_{ICD_{mid}}=\tan\rho$$

$$K_{ICD_{mid}}=Y_{ICD_{mid}}-M_{ICD_{mid}}(X_{ICD_{mid}})$$

The intersection of lines $IAB_{mid}$ and $ICD_{mid}$ is the impact location (I) whose coordinates $(I_x,I_y)$ can be determined using the calculated slopes and constants as follows:

Known:

$$I_x = X_{IAB_{mid}} = X_{ICD_{mid}}$$

$$I_y = Y_{IAB_{mid}} = Y_{ICD_{mid}}$$

Solving the equation of a line yields:

$$M_{IAB_{mid}}(I_x) + K_{IAB_{mid}} = M_{ICD_{mid}}(I_x) + K_{ICD_{mid}}$$

$$I_x = \frac{(K_{ICD_{mid}} - K_{IAB_{mid}})}{(M_{IAB_{mid}} - M_{ICD_{mid}})}$$

$$I_y = M_{IAB_{mid}}(I_x) + K_{IAB_{mid}}$$

When an impact location is located on or near a line (not shown) that intersects each of $AB_{mid}$ and $CD_{mid}$, the location calculations for that impact location are prone to inaccuracy because the angles, δ and ρ, are very small. Accordingly, when δ and ρ, are very small, for example, less than approximately six degrees, time difference of arrival FIG. 200 (FIG. 8) between second sensor 55B and third sensor 55A is employed to determine $I_x$ as follows:

$$I_x = X_o \pm Vel(\Delta t_{BC})/2$$

The y coordinate, $I_y$, for impact location that is on or near a line that intersects each of $AB_{mid}$ and $CD_{mid}$ is determined from using first and second time difference of arrival FIGS. 196 and 198, as discussed previously. Thus, impact location 34 is readily determined by solving a set of linear equations by employing time difference of arrival figures between pairs of pressure sensors.

In summary, the present invention teaches of a system for determining an impact location of a projectile. The system employs a damage resistant strike plate, such as polycarbonate for lighter, slower projectiles and a layered steel/foam/polycarbonate strike plate for heavier, faster projectiles. Impact location information is readily calculated by solving a set of linear equations and is provided to a user in a visual display. The paired pressure sensor arrangement increases the accuracy of the impact location determination by decreasing the size of the areas in which calculation error may occur. In addition the paired pressure sensor arrangement accommodates large target areas. In addition, the configuration of the signal processing circuit, and the simple linear calculations allow the impact location to process location data quick enough to accommodate rapid fire projectiles.

Although the preferred embodiments of the invention have been illustrated and described in detail, it will be readily apparent to those skilled in the art that various modifications may be made therein without departing from the spirit of the invention or from the scope of the appended claims. For example, different strike plate materials may be used that exhibit a pressure disturbance propagation velocity that is readily distinguished from the velocity of an acoustic wave through that material.

What is claimed is:

1. A system for determining the precise location of an impact point of a projectile on the surface of a strike plate with the use of a plurality of pressure sensor pairs, an electronic signal processing circuit comprising:

a) said strike plate having predetermined shape and size sufficient to accommodate use as a projectile target;

b) said strike plate having two substantially flat planar surfaces, a front side planar surface and a rear side planar surface, said surfaces being substantially parallel to each other;

c) means to substantially prevent penetration or damage of said front planar surface of said strike plate by said projectile;

d) means to substantially prevent penetration or damage of said front planar surface of said strike plate by said projectile or multitude of subsequent projectiles at the same point of impact on said front planar surface;

e) a pressure sensor providing means of isolating a pressure disturbance event selected from a plurality of pressure disturbance events urged from any direction within said strike plate when said projectile impacts said strike plate, and said pressure disturbance event having a speed other than the speed of sound;

f) a pressure sensor pair comprised of two said pressure sensors having a predetermined distance between said pressure sensors;

g) a plurality of said pressure sensor pairs;

h) a means for mounting in predetermined locations said plurality of said pressure sensor pairs with respect to said rear planar surface;

i) an electronic signal processing circuit in communication with said plurality of pressure sensor pairs thereby providing a means for determining a multiple of time difference of arrivals of said pressure disturbance event among said plurality of pressure sensor pairs;

j) a means of converting said multiple of time difference of arrivals into a calculated impact point, said calculated impact point being located within a predetermined tolerance of said impact point of said projectile on said front planar surface;

k) a means for converting said calculated impact point into an indicium;

whereby said system will locate the precise impact point of said projectile on said strike plate and generate indicium relative to said precise impact point, whereby one or a plurality of humans can discern the precise location of an impact point of a projectile on the surface of a strike plate, whereby one or a plurality or humans can discern the precise locations of a plurality of impact points of a plurality of projectiles on the surface of a strike plate even if such impact points overlay.

2. A system as claimed in claim 1 providing a means to receive, calculate, store and communicate data concerning a plurality of impact points from a plurality of projectiles impacting said strike plate in succession thereby providing a means for determining said plurality of impact points.

3. A system for determining said impact location of said projectile comprising:

a) a plate having a planar surface adapted to be impacted by said projectile without penetration or damage to the planar surface;

b) pressure sensors embedded within said plate at predetermined locations and spaced apart from said planar surface for detecting said pressure disturbance event outwardly propagating through said plate from said impact location on said planar surface;

c) a signal processing circuit in electrical communication with said pressure sensors for measuring the time difference of arrivals of said pressure disturbance event between paired ones of said pressure sensors and determining said impact location on said planar surface in response to said time difference of arrivals, wherein first and second ones of said pressure sensors form a first pair of said paired ones of said pressure sensors and third and fourth ones of said pressure sensors form a second pair of said paired ones of said pressure sensors.

4. A system for determining an impact location of a projectile comprising:

a plate having a planar surface adapted to be impacted by said projectile, and said planar surface having a first edge, a second edge intersecting said first edge at a first corner, and a third edge intersecting said second edge at a second corner;

pressure sensors embedded within said plate and spaced apart from said planar surface for detecting a pressure disturbance event outwardly propagating through said plate from said impact location on said planar surface, said pressure sensors including a housing having a cavity formed therein, a pressure sensing element located in said cavity, a damper abutting said pressure sensing element, and a retainer abutting said damper for securing said pressure sensing element and said damper in said cavity; and a signal processing circuit in electrical communication with said pressure sensors for measuring time difference of arrivals of said pressure disturbance event between paired ones of said pressure sensors and determining said impact location in response to said time difference of arrivals; wherein first and second holes extend into said plate proximate said first corner, each of said first and second holes are located a radial distance from an approximate midpoint of said planar surface, and said first and second holes are separated by a first distance, said first distance being less than said radial distance;

first and second ones of said pressure sensors are located in said first and second holes, said first and second pressure sensors forming a first pair of said paired ones of said pressure sensors;

third and fourth holes extend into said plate proximate said second corner, each of said third and fourth holes are located said radial distance from said approximate midpoint, and said third and fourth holes are separated by a second distance, said second distance being less than said radial distance; and third and fourth ones of said pressure sensors are located in said third and fourth holes, said third and fourth pressure sensors forming a second pair of said paired ones of said pressure sensors.

5. A system as claimed in claim 4 wherein said planar surface of said plate has a fourth edge intersecting said third edge at a third corner and intersecting said first edge at a fourth corner, and said system further comprises:

a fixed base;

a pivot member coupled to said fixed base and having a pivot axis, such that a distance between said pivot axis and said fourth edge is less than a distance between said pivot axis and second edge; and mounts secured to said pivot member and said plate proximate said fourth edge for allowing rotation of said plate about said pivot axis relative to said fixed base.

* * * * *